United States Patent [19]
Heideman et al.

[11] Patent Number: 6,013,997
[45] Date of Patent: Jan. 11, 2000

[54] THREE DIMENSIONAL TACTILE SEAM TRACING DEVICE

[75] Inventors: Robert James Heideman, Kewaskum; Elmer Gerald Blachowiak, Hubertus; Christopher Brian Smith, Wauwatosa; Stephen Lee Carian, Milwaukee; Brandon Stuart Tarr; Neil Arthur Duffie, both of Madison; Michael Harry Predith, Pewaukee, all of Wis.

[73] Assignee: Tower Automotive, Inc., Milwaukee, Wis.

[21] Appl. No.: 09/135,321

[22] Filed: Aug. 7, 1998

[51] Int. Cl.$^7$ .................................................. B64C 17/02
[52] U.S. Cl. .......................................... 318/648; 228/102
[58] Field of Search .............................. 318/560, 568.12, 318/575, 648, 570, 568.13; 219/124.34; 901/2, 14, 16, 33, 42

[56] References Cited

U.S. PATENT DOCUMENTS 5,782,401  7/1998  Hinrichs .................................. 228/102

OTHER PUBLICATIONS

"Development of a Modern Tactile Seam Tracking System" by Christopher B. Smith, (Master Thesis Paper) 1995.
"Development of an Automated Guidance and Dynamic Measurement System for Coordinated Measuring Machines and Robotic Devices" by Kam C. Lau, (Doctoral Thesis Paper) 1981.
"Seam Tracking System for a Modern Industrial Robot" by Christopher B. Smith , Jeffrey S. Noruk, Neil A. Duffie, Elmer G. Blachowiak and John F. Hinrichs; AIAA Robotics Technology Forum: Advanced Developments in Space Robotics, Madison, WI Aug. 1–2, 1996, pp. 171–177.

"Automated Welding Using Spacial Seam Tracing" by John G. Bollinger and Howard L. Harrison; Welding Journal, Nov. 1971.

"A Sensor Based Technique for Automated Robot Programming" by N. Duffie, J. Bollinger, L. Van Aken, R. Piper, J. Zik, C. Hou, K. Lau; Journal of Manufacturing Systems, vol. 3, No. 1.

Computer Controlled Self Programming Welding Machine by J. G. Bollinger and P. W. Ramsey, Reprinted from Welding Journal, May, 1979.

"Automated Three–Dimensional Scanning, Measurement, and Display of Machine Parts" by James J. Zik (Master Thesis Paper) 1983.

Primary Examiner—William M. Shoop, Jr.
Assistant Examiner—Rina I. Duda
Attorney, Agent, or Firm—Craig J. Lervick

[57] ABSTRACT

The three dimensional probe device of the present invention is mountable on a working end of a fully automated and articulated robotic arm movable through at least five degrees of axial freedom in a global dimensional reference. The three dimensional probe device comprises a base, a carriage, a probe, a Z axis measuring apparatus and a tilt measuring apparatus. The probe tip contacts the work piece surface to be traced with deflections in the workpiece seam or path resulting in movement of the carriage and probe. The probe includes a plate and a ball which is pivotable in a ball socket portion of the carriage. Movement of the carriage in relation to the base provides measurement data for rotational change in the direction of the workpiece path or seam. Tilting of the probe provides measurement data for translational change in the direction of the workpiece path or seam.

17 Claims, 3 Drawing Sheets

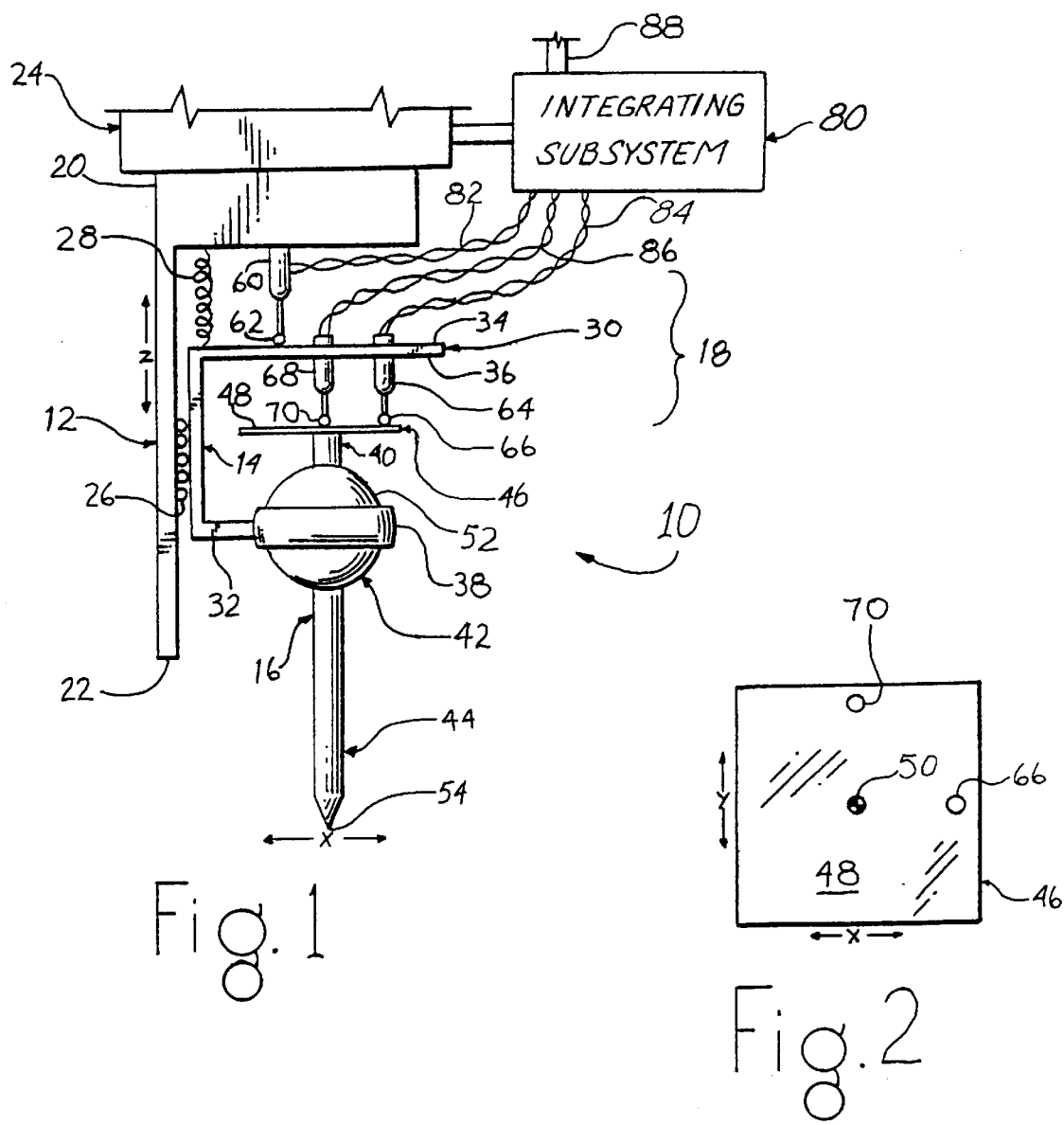

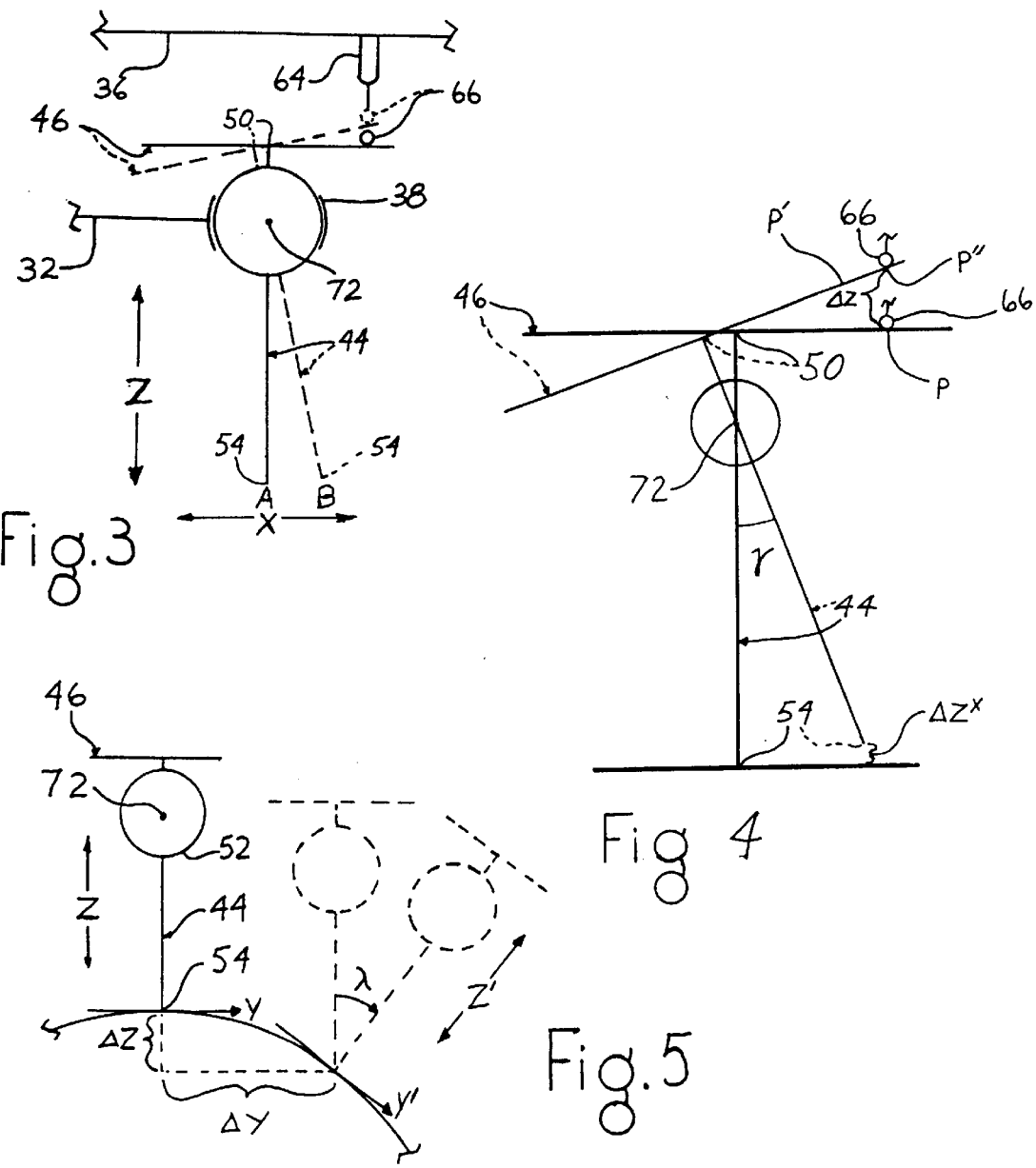

ional tactile probe traces the path, any change in the path in three dimensions results in a deflection of the tip of the tactile probe which is detected by the tactile probe transducers producing signals proportional to the degree and direction of the change which results in a correcting movement of the robot arm to maintain the overall orientation of the three dimensional tactile probe coordinate system relative to the local coordinate system of the workpiece. The present invention incorporates complex algorithms to undertake the processing of the deflection changes measured by
THREE DIMENSIONAL TACTILE SEAM TRACING DEVICE

FIELD OF THE INVENTION

The present invention relates to automatic tracing of a path or seam on a surface in three dimensions. Particularly, this invention relates to a three dimensional measuring probe carried on the working end of a fully automated robotic arm capable of articulated motion in six dimensions and including memory for the robot in re-tracing the three dimensional path traced by the probe.

BACKGROUND OF THE INVENTION

Since the dawn of the industrial age, engineers have searched for more efficient and cost effective methods and means for manufacturing. Automating the assembly line with robotic machines faithfully repeating the same motions with a high level of accuracy and speed has significantly improved the efficiency of manufacturing. This automation leads to concomitant decrease in costs while providing improved quality control. However, the more sophisticated the automation, the greater the need for more sophisticated control systems to manage the robots.

Many tasks in manufacture and assembly involve the joining of two or more parts. These tasks, and many others, are difficult for a robotic machine to repeatedly perform well. Examples are seam welding or gluing, or more collectively, any task that requires the robotic machine to follow a path on the workpiece, such as the seam. For many workpieces, this seam meanders in three dimensions. The fundamental difficulty for the robotic machine is the geometric problem of positioning the tool, then moving the tool to maintain close position tolerance. The positioning step must be done with the correct translational and rotational orientation relative to a curved seam lying in three dimensional space. The robotic machine must then be able to follow the seam while maintaining the proper orientation and traveling at relatively high speeds. In the absence of some probe or other seam tracking device, the robot must be manually taught to follow a seam. Manually teaching a robot each and every minute maneuver is a time consuming, labor intensive task.

A complication is that no two workpieces are the same. Workpieces vary because as the various individual parts to be assembled are manufactured, the dies, cutters, extruders and stamps used to produce the individual pieces are subject to wear and changing environmental conditions. Changes in the die, cutters, material properties, etc., cause changes in the overall dimensions and quality of any given piece compared to its design standard. A manually taught robot must then be programmed to account for the variation from one workpiece to the next. However, this reprogramming requires an operator to anticipate which way the variation will occur, a task that is not easily accomplished.

One of the advantages of using robotic machines in manufacture and assembly is that the machines may be taught a particular task that the robot will repeat nearly flawlessly and with substantially higher speed than more conventional, or traditional, means of accomplishing the task. However, how the robotic machine is taught the task usually requires considerable forethought and design engineering.

For example, with lap joint welding, the task varies from simple to complex depending on the complexity of the joint. If the joint is formed between two flat, straight pieces of metal, the task for the robotic machine is simple. The machine is taught to align the welding gun at a certain orientation to the lap joint and move along the joint confined to a single direction. Such a process is easy to reproduce and is reliable, but also requires that either the workpieces or must be fed in from the same direction and with the same orientation each time or the robotic arm limited to moving in the same direction and orientation. This type of automatic system is useful, but is limited, because the entire assembly plant must be planned in a specific fashion to feed the pieces to the robotic machine in a particular way in order to accommodate the limitations imposed on the robotic machine by the closed loop control architecture.

Design engineering has led to the development of industrial robots with open control architecture. These robots have six degrees of freedom, those being translation along the X, Y, and Z axes, and rotation, or orientation, about the X, Y, and Z axes. A robot with open control architecture is able to integrate with a seam tracking device to provide the robot the ability to teach itself the path that it is to follow. How the robot performs this is dependent on the type of seam tracking device used and how the seam tracking device interfaces with the robot control architecture. An example of a seam tracking device is a tactile probe.

An example of an early closed loop control architecture robot using a two dimensional tactile probe is described in *Automated Welding Using Special Seam Tracing*; Bollinger, John G. and Harrison Howard L., *Welding Journal*, pages 787–792, November 1971. In this paper, the authors describe the basic geometry and coordinate definitions of a five axis tracing machine using a two dimensional probe.

The tactile probe carried at the distal end of the robot arm traditionally has also been restricted in axial degrees of freedom, usually just to the X and Z axes, with X defined as being lateral to the instantaneous direction of travel, Y being along the path, or tangential to the path, and Z being normal to surface of the path. With two dimensional tracing probes, it is necessary to constrain the device in some fashion in order to maintain a required orientation to the seam or path so that the mechanism measuring the X axis remains orthogonal to the path. This requirement places an additional control burden on the robot arm and the control systems.

Consequently, there is a need for a three dimensional tactile probe, integrated with a robotic arm machine having an open control architecture, for tracing paths and seams along a workpiece that is not encumbered by restrictions in orientation of the tactile probe or tactile probe sensors to the workpiece path or seam while following the path or seam in three dimensions.

SUMMARY OF THE INVENTION

The present invention discloses a tactile probe for seam tracing or other similar functions that follow a path, or seam, in three dimensions on a workpiece surface. This three dimensional tactile probe uses a device coordinate system as a reference for changes in position and orientation to the workpiece surface local coordinate system. As the three dimensional tactile probe traces the path, any change in the path in three dimensions results in a deflection of the tip of the tactile probe which is detected by the tactile probe transducers producing signals proportional to the degree and direction of the change which results in a correcting movement of the robot arm to maintain the overall orientation of the three dimensional tactile probe coordinate system relative to the local coordinate system of the workpiece. The present invention incorporates complex algorithms to undertake the processing of the deflection changes measured by the transducers and calculating the transformation from the device coordinate system to the local global coordinate system of the robot.

The three dimensional tactile probe device of the present invention is mountable on a working end of a fully automated and articulated robotic arm having six degrees of freedom. A maximum of six is possible, three translational axes, X, Y, and Z, and three rotational axes about the X, Y, and Z axes, i.e., pitch, roll, and yaw. The three dimensional probe is used for three dimensional tactile tracing of a surface of a workpiece in an orthogonal coordinate system using a workpiece or local dimensional reference of an X axis, a Y axis and a Z axis, as the device is moved by the robotic arm and operably engages the workpiece. For the purpose of this disclosure, this local coordinate system references the device to that point C on the workpiece surface in contact with the tactile probe tip, i.e., the instantaneous local coordinate reference. The Y axis is defined by the projected line of travel with the positive Y axis in the direction of travel, i.e., the tangential axis defined by the tangent to the point of contact. The X axis is orthogonal to the Y axis in the general plane of the surface of the workpiece with the positive X axis clockwise to Y, i.e. the lateral axis. The Z axis is orthogonal to both of these, i.e., the axis normal to the surface.

In addition, this disclosure makes use of referring to a device coordinate system using a X' axis, a Y' axis, and a Z' axis. The Z' axis is that axis that is parallel to the longitudinal axis of the device with X' and Y' axes orthogonal to Z' and each other.

As the device is moved over the workpiece surface, so does this local coordinate system, referencing to the point on the surface of the work piece that the distal tip of the device is in contact with. The device also has an orientation relative to that position. Depending on the task to be performed, one method of orientation is to orient the Z' axis of the device parallel to the Z axis of the local coordinate system. For lap joints and similar workpiece constructions where two or more pieces join at angles to each other, then an ideal orientation for the Z' axis of the device and Z axis of the local coordinate system might be at an angle that is generally half the angle formed between the angled surfaces of the parts. Thus, the Z axis of the local coordinate system, bisecting the angle of the joint, creates a working plane in the X and Y axes for the surface of the workpiece.

An embodiment of the three dimensional tactile probe device of the present invention comprises a base, a movable carriage, a tiltable stylus, a Z' axis measuring apparatus and a tilt measuring apparatus. The device is generally oriented proximal to distal along the Z' axis. The base has a proximal end for attaching proximally to the working end of the robotic arm, and an opposite distal end. The base also has a first surface that is oriented parallel to the Z' axis, extending distally from the proximal end. The carriage is operably mounted to the first surface and has a reversible motion confined to the Z' axis. The motion of the carriage relative to the base is biased toward the distal end of the base. The carriage also includes a proximal arm and a distal arm. The proximal arm is aligned, generally, orthogonal to the Z' axis and has a proximal surface and a distal surface.

The stylus is a generally elongate structure having a longitudinal axis and includes a proximal portion, a mid portion and a distal portion aligned along this longitudinal axis of the stylus. The proximal portion includes a plate with a flat surface orthogonal to the stylus longitudinal axis, with the longitudinal axis defining a center point on the flat surface. The mid portion includes a pivoting apparatus attachable to the distal arm of the carriage providing for operably pivoting the stylus and defines a center pivot point on the stylus longitudinal axis. The pivoting apparatus includes such mechanisms as a ball and socket and gimbaled mounts. The center point of the plate is fixed a known first distance from the center pivot point. The distal portion includes a distal tip suitable for operably engaging the surface of the workpiece and is fixed a known second distance from the center pivot point along the stylus longitudinal axis. When the stylus is attached to the distal arm, the flat surface faces generally proximally toward the distal surface of the proximal arm.

The Z' axis measuring apparatus is operably positionable between the base and the proximal surface of the proximal arm and is suitable for measuring the distance of movement of the carriage relative to the base parallel to the Z'-axis. The Z' axis measuring apparatus generates a measurement data stream related to motion of carriage along the Z' axis.

The tilt measuring apparatus is operably positionable between the flat surface of the plate and the distal surface of the proximal arm and is suitable for measuring the tilting of the flat surface of the plate in relation to the Z' axis as a result of pivoting the stylus. The tilt measuring apparatus also generates a measurement data stream related to the tilt of the stylus relative to the Z' axis.

The tactile probe device further comprises a transformation and control subsystem operably connecting the Z' and tilt measuring apparatuses to the robotic arm for integrating the measurement data streams from the Z' and tilt measuring apparatuses into the operation of the robotic arm. The deflections of the stylus are transformed into controlled robot arm movements that are used to maintain the orientation of the tactile probe device to the workpiece surface. The transformation and control subsystem further includes a method and apparatus including signal conditioners and software programming for receiving the measurement data streams, a method and program including algorithms for processing the measuring data received in the measurement data streams which includes determining the amplitude of change, the change over time and the direction of the change, a method and apparatus including programming for controlling the articulations of the robotic arm in response to the changes, and a method and apparatus including software and computer memory for remembering the measurement data stream, the processing steps, and the control commands, providing for the ability to reproduce the same path motion and orientation of the three dimensional tactile probe device or any other tool attachable to the robotic arm.

Thus, the transformation and control subsystem integrates deflection of the distal tip in contact with the workpiece to movement of the robotic arm adjusting the orientation of the three dimensional tactile probe to the instantaneous local coordinate system as the robotic arm moves the device along the path of the workpiece. The process is begun when the device is positioned with the distal tip in contact with a point on a surface of the workpiece in an optimal orientation to the local X, Y, and Z axes in relation to the surface point of the workpiece. Then any measured deflection of the distal tip, in the device X', Y', and Z' axes, caused by movement of the device by the robotic arm across the workpiece surface, results in commands from the transformation and control subsystem to the robotic arm. These commands change articulations of the robotic arm and counter the deflections of the distal tip, thus maintaining the position and optimal orientation, in the local X, Y, and Z axes, of the device over that point of the surface of the workpiece in contact with the distal tip during movement of the device.

The memory apparatus stores in memory at least the start position, the optimal orientation, the deflections, if any, of the distal tip as the device is moved by the robotic arm, and the commands to the robotic arm, in relation to the global reference system, to change articulations of the robotic arm so as to maintain the position and optimal orientation of the device over the point of the surface of the workpiece in contact with the distal tip during movement of the device.

The three dimensional tactile probe device of the present invention further includes a mechanism operably engaging the pivot apparatus for biasing the stylus toward centering the longitudinal axis of the stylus parallel to the Z' axis. Additionally, there is also included a friction reducing mechanism operably engaging the distal tip for reducing friction encountered by the distal tip engaging the surface of the workpiece. One such mechanism includes a rolling ball in a socket.

Other objects of the present invention and many of the attendant advantages of the present invention will be readily appreciated as the same become better understood by reference to the following detailed description when considered in connection with the accompanying drawings.

BRIEF DESCRIPTION OF THE DRAWINGS

FIG. 1 is a side elevational view of an embodiment of the present invention;

FIG. 2 is a top plan view of just a portion of the embodiment of FIG. 1, the flat plate;

FIG. 3 is a simplified diagrammed side elevational view of the stylus portion relative to just one transducer of the embodiment of FIG. 1 in which the phantom lined portion refers to a second position of the device;

FIG. 4 is a geometric representation of the relationship of the two positions of the device depicted in FIG. 3;

FIG. 5 is a simplified diagrammed side elevational view of just the probe portion of the embodiment depicted in FIG. 1 in which the phantom lined portions refer to a second position along a seam or path showing the correction of the position and orientation.

DETAILED DESCRIPTION OF THE INVENTION

Figure 6:
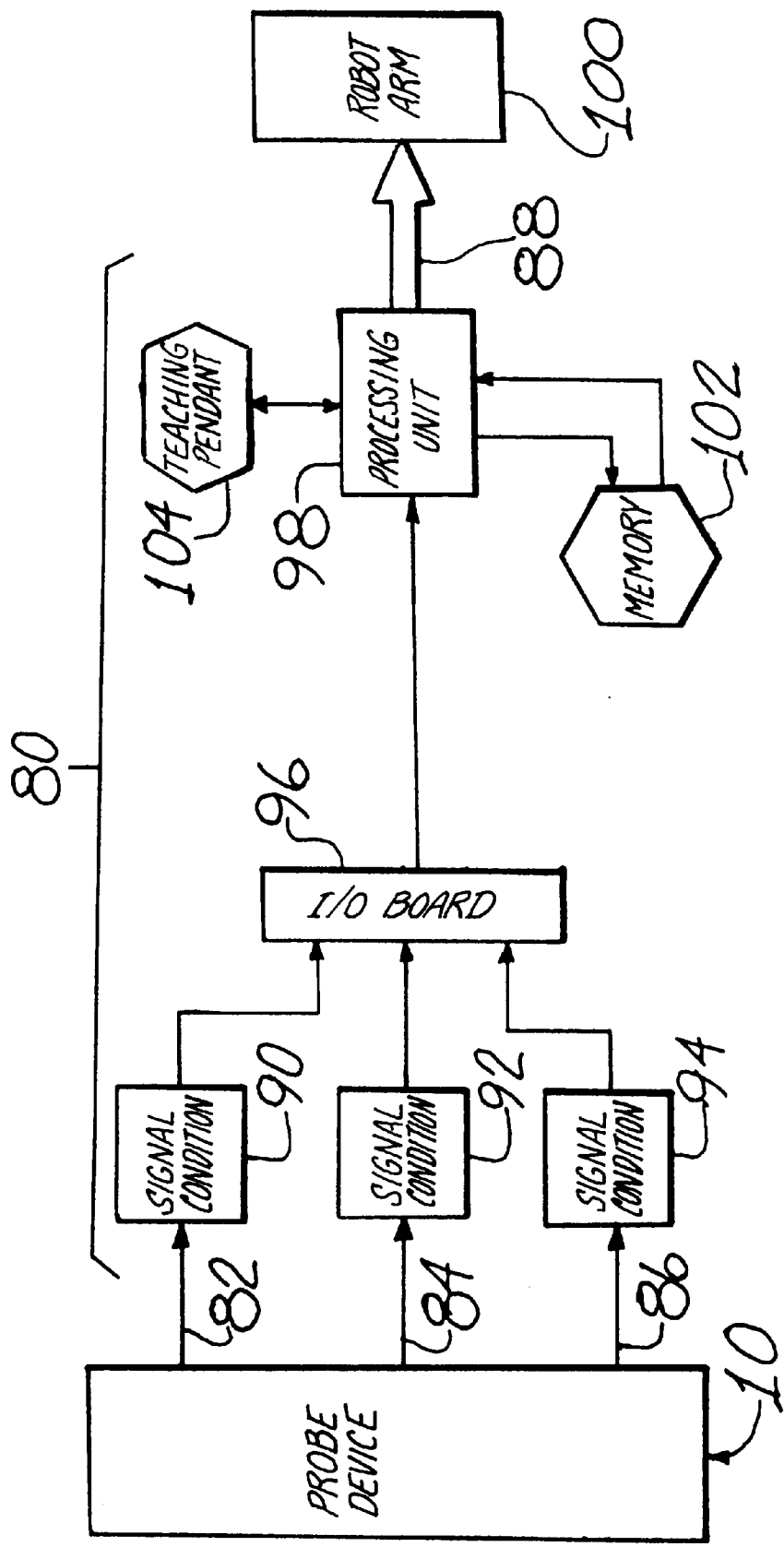
FIG. 6 is a block diagram schematic of one embodiment of a transformation and control subsystem according to the present invention.

In reference to FIGS. 1 and 2, there is disclosed a three dimensional tactile probe device 10 as an embodiment of the present invention. Tactile probe device 10 comprises a base 12, a carriage 14, a stylus 16 and a measuring subassembly 18. Base 12 includes a proximal end 20 and a distal end 22. Proximal end 20 is attachable to a working end of a robotic arm 24 in a cooperative fashion to facilitate accurate reproducible alignment of a local X', Y', and Z' axes coordinate system of tactile probe device 10 in relationship to a global coordinate system in use by robotic arm 24. Proximal to distal is oriented generally along the local Z' axis of tactile probe device 10. Robotic arm 24 may be any suitable robotic device which is capable of full automation, as well as manual control, and is articulated for motion in six axes of a global coordinate system. Those six global axes comprising translation along global X, Y, and Z axes, and rotation about the X, Y, and Z axes, the equivalent of pitch, roll and yaw.

Carriage 14 engages base 12 through an assembly 26 cooperating between carriage 14 and base 12 to confine the motion of carriage 14, relative to base 12, along the local Z axis. Assembly 26 may include such mechanisms as a roller assembly or a linear bearing assembly. Carriage 14 includes a proximal arm 30 and a distal arm 32. Proximal arm 30 includes a proximal surface 34 and a distal surface 36. Distal arm 32 includes a ball socket 38.

Stylus 16 includes a proximal portion 40, a mid portion 42 and a distal portion 44 aligned along a longitudinal axis of stylus 16. Proximal portion 40 further includes a plate 46 having a flat surface 48 orthogonal to the longitudinal axis of probe 16 and a center point 50 defined by the longitudinal axis of probe 16 passing through flat surface 48. As shown in FIG. 2, plate 46 is square in shape, but may, in fact, have any shape that provides a flat surface.

Mid portion 42 comprises a ball 52, suitable for pivotal engagement within ball socket 38, and has a center pivot point lying on the longitudinal axis of stylus 16. Ball 52 is placed in ball socket 38 so that flat surface 48 faces generally proximally toward distal surface 36 and ball 52 engages ball socket 38 with the longitudinal axis of probe 16 generally aligned along the local Z' axis of tactile probe device 10.

Distal portion 44 includes a distal tip 54 which is suitable for operably engaging a point of contact on the surface of the workpiece. Distal tip 54 is drawn along the surface of the workpiece by the robotic arm in order to trace the seam or path of the workpiece. To reduce drag related to friction between distal tip 54 and the surface of the workpiece, the present invention anticipates the use of mechanisms that decrease the friction. A rolling ball within a socket held at the tip, much like the ball point tip of a pen is representative of such mechanisms. However, the introduction of any friction reducing device should contemplate not using a mechanism so large as to substantially change the local geometry of the device of the present invention and introduce additional error because of the size of the device.

Additionally, the present invention anticipates the use of a mechanism, not shown in the Figures, for biasing the orientation of stylus 16 toward aligning the longitudinal axis of stylus 16 with the Z' axis. This amounts to a self-centering mechanism. Possible mechanisms for use in the self-centering of stylus 16 include spring biasing or an electromagnetic mechanism. One method includes the addition of a cylindrical housing mountable to the proximal arm and distal arm of the carriage and over the stylus and pivot mechanism from which springs, leaf or coil, may extend between the stylus and the housing. An alternative arrangement includes springs between distal arm 32 and stylus 16. An example of an electromagnetic mechanism anticipates cooperating magnets as part of ball socket 38 and formed within, or as part of, stylus 16 and adjusted to provide self-centering pressure on stylus 16.

Tactile probe device 10 includes a device Z' axis measuring device operably positioned between base 12 and carriage 14 for measuring the change in distance between base 12 and carriage 14 along the device Z' axis as a result of any motion at roller assembly 26. As shown in FIG. 1, this measuring device comprises a first transducer 60, such as a linear variable differential transformer (LVDT). One such LVDT useful in the present invention is that supplied by RDP Electrosense, Inc., of Pottstown, PA, under the catalog number of D 5/200H. First linear transducer 60 is fixedly mountable proximally to base 12 and includes a movable effector 62 operably engaging proximal surface 34. Alternative measuring devices are available, including optical measuring systems prevalent in the measuring arts, with or without scanning grid matrices, that may be mounted to base 12 or proximal surface 34.

In addition, tactile probe 10 includes a tilt measuring device operably positioned between proximal arm 30 and plate 46 for measuring the change in the tilt of plate 46 in relation to the device Z' axis. Measuring the angle and direction of the tilt of plate 46 may be accomplished using a number of different methods and devices. As shown in FIG. 1, one tilt measuring device comprises a second transducer 64, such as a LVDT, having a moveable effector 66 in slidable contact with flat surface 48 and a third transducer 68, such as a LVDT, having a moveable effector 70, also in slidable contact with flat surface 48. Examples of LVDTs useful in the present invention in these two positions are those supplied by RDP Electrosense, Inc., of Pottstown, Pa., under the catalog number of GTX500Z.

In this embodiment, both linear transducers 64, 68 are fixedly mounted parallel to the device Z' axis and at two points at a right angle to the device Z' axis on distal surface 34 of proximal arm 30, with effectors 66, 70 in operable contact on flat surface 48 at a right angle to the device Z' axis, as shown in FIG. 2. For the purpose of discussion, transducers 64, 68 and effectors 66, 70 may be said to be on the device X' and Y' axes, respectively. The measuring of the tilting of plate 46 is readily accomplished by simultaneously measuring the change in distance imparted in transducers 64, 68 by the tilting of plate 46 from a deflection of distal tip 54. Through mathematical algorithms, a solution may be derived for the vector of the tilt relative to the device X' and Y' axes.

The present invention is not limited to transducers aligned parallel to the device Z' axis. These transducers may be held in a skewed alignment, i.e., at an angle to the device Z axis. Skewing the second and third linear transducers at an inward angle, proximal to distal, does alter the mathematics for computing the tilt vector. Alternatively, the transducers need not be at a right angle to each other to provide for a solution of the tilt vector, providing for using any angle greater than zero.

As with the local Z axis measuring device, there are available alternative tilt measuring devices known in the measuring arts, such as mechanical or optical systems for measuring changes in distance. Optical systems include lasers, with or without scanning of grids or graphics attachable to the flat surface. Depending on the magnetic or optical system, tilt measuring would not necessarily be confined to two points of measurements to derive a tilt vector.

The measurement data streams generated by probe device 10 could be used to indirectly drive the servos and motors of the robot arm using a direct feedback loop to keep the probe device on track and at the proper orientation to the surface of the workpiece. Additionally, the three dimensional tactile probe of the present invention also anticipates the use of a transformation and control subsystem, such as integrating subsystem 80, for operably connecting the Z' axis measuring mechanism and tilt measuring mechanism between probe device 10 and robot arm 24. Such an integrating subsystem is diagrammed in FIG. 6 depicting integrating subsystem 80 as receiving the measurement data streams over wires 82, 84 and 86 respectively into signal conditions 90, 92 and 94 respectively.

After receiving the measurement data streams, the data is then processed through an I/O board 96 to processing unit 98. In processing unit 98 the measurement data streams are processed according to programming to render the measurement data streams, which are correlated to axial measurement changes in the local coordinate system of probe device 10, into axial measurement changes in the global coordinate system of the robot. These processed measurements are convertible into control commands to be issued to robot arm 24 over bus 88 effecting appropriate movement of a robot arm 100. The entire sequence of events, including start position, start orientation, initial direction of travel and total distance traveled, along with every change in the articulations of the robot are also kept in a memory 102 for reproducing the movement of the probe over the path, or more importantly, swapping out the probe for a tool, such as a welding tool so that the welding tool may then follow the same path with the same orientation. In addition, the present invention also anticipates the use of a teaching pendant 104 for use by an operator to facilitate input of data and teaching parameters to the subsystem.

Mathematical and computer algorithms have been developed for use in an integrated subsystem such as that found in integrating subsystem 80. These algorithms are extensive and detailed, using a world, or global coordinate system interfacing with the 3-D tactile probe 10 in a device coordinate system that is in contact with a point on the workpiece surface in a local coordinate system. The mathematical treatment of these algorithms is given below.

In operation, and in reference to FIGS. 3, 4 and 5 probe device 10 uses deflections of distal tip 54, traveling along a seam, joint or similar path on a workpiece, and reference to the local X, Y, and Z axes, to determine the direction and magnitude of change in the seam or joint's path. This information is used by integrating subsystem 80 to follow and memorize the path, which may also be used as feedback to the robotic arm to maintain orientation of probe device 10 to the local coordinate reference of the workpiece within preset working specifications.

For the purpose of clarity in discussion, the movements that probe device 10 is capable of will be split into two isolated examples. The first example, a translational movement of distal tip 54, is depicted in FIGS. 3 and 4, where a partial diagram of probe device 10 is depicted. There is shown a simplified example of a change in position of distal tip 54 in the device X' axis direction with pivoting of stylus 16 at a center pivot point 72 corresponding to the center pivot point of ball 52. This translational movement of the tip in the device X' axis is equivalent to rotation about the device Y' axis at pivot 72. A translational movement in the device Y' axis is equivalent to a rotation about the device X' axis. For descriptive convenience, only the translation in the device X' axis with rotation about the device Y' axis is shown. For those skilled in the art, imagining the second translation and rotation should be straight forward. Linear transducers 64, 68 are preferably 90° from each other for ease of computing the tilt, but transducers 64, 68 may be at any angle to the instantaneous local X axis. The description of the mathematics given below is for two transducers at 90° from each other and combines these two.

Therefore, as the robotic arm moves probe device 10 generally in the local Y axis direction, any change in the path's local X axis direction will be detected by probe device 10 as a deflection in distal tip 54, for example, deviating from position A to position B, as shown in FIG. 3. Since device X' and Y' axes are independent of local X and Y, the deflection of distal tip 54 in just the local X axis direction may involve deflection in both of the device X' and Y' axes. This deflection of distal tip 54 results in a pivoting of ball 52 in ball socket 38 about center pivot point 72 with tilting of plate 46 by the same angle. In this example, tilting of plate 46 results in depressing effector 66 which is detected as measurement data. As noted above, for convenience, only deflection in the device X' axis will be discussed.

As is shown in FIG. 4, the distance from plate center point 50 to the point P is the known distance from center point 50 of plate 46 to point P in contact with effector 66 when probe 16 is in a neutral position, i.e., the position when distal tip 54 is at A. The distance from center pivot point 72 to center point 50, as well as, the distance from center pivot point 72 to the distal most aspect of distal tip 54 in contact with the workpiece surface are also known. When a deflection occurs, the effector, such as effector 66 moves. In this example, movement of effector 66 depresses the linear transducer into its housing. Thus, the degree of tilting, i.e., depression of effector 66 over distance Δz, is also known. Since these distances are known, and that the deflection measured in the device X' direction is equivalent to a rotation about the device Y' axis, then solving for γ, the degree of rotation, involves solving for coordinates of distal tip 54 as deflected from point A to point B as a complex trigonometric function.

The simultaneous solution of the deflection in the device X' and Y' axis solves for the translational deflection of distal tip 54 resulting in a tilt vector, with the entire tilt measuring mechanism providing for a vectored answer for both degree and direction of the deflection. The tilt vector may be assumed to correspond to the deflection of distal tip 54 in the local X axis. A direct consequence of computing a tilt vector is that neither linear transducer 64 or 68 needs to be constantly aligned along the instantaneous local X axis in order to compute translational changes in the X axis.

To compute the deflection of the stylus tip from the displacement measurement data provided by the LVDTs, the x, y, and z coordinates of any point on the stylus after deflection must be known. To determine the position of the stylus in the X'-Y' plane, given the deflections of the LVDTs, the theory of coordinate system transformation is applied. A coordinate system is placed on the stylus in its neutral position and another is placed on the stylus in its deflected position. The transformation between the two coordinate systems can be described by two successive simple transformations. These two simple transformations are equated to rotations about the device X' axis as angle β, and Y' axis as angle γ. These angles are referred to as Euler angles in this field of mathematics. With x, y, and z representing the initial starting point of the stylus tip, i.e., point A in FIG. 3, then the coordinates x", y", and z" represent that other point as deflected. These coordinates may be solved using the following:

$$\begin{Bmatrix} x \\ y \\ z \end{Bmatrix} = \begin{bmatrix} \cos\gamma & \sin\gamma\sin\beta & -\sin\gamma\cos \\ 0 & \cos\beta & -\sin\beta \\ -\sin\gamma & \cos\gamma\sin\beta & \cos\gamma\cos\beta \end{bmatrix} \begin{Bmatrix} x'' \\ y'' \\ z'' \end{Bmatrix} \quad \text{Eq. 1}$$

Using equation 1, and the fact that the stylus tip is a given distance in the z" direction defined by the geometry of the stylus, the displacements of the stylus tip in the device coordinate system are:

$$x_t = -z_t'' \sin\gamma \cos\beta$$
$$y_t = -z_t'' \sin\beta \quad \text{Eq. 2}$$
$$z_t = z_t'' \cos\gamma \cos\beta$$

Where:
$x_t$=the position of the stylus tip on the device X' axis;
$y_t$=the position of the stylus tip on the device Y' axis;
$z_t$=the position of the stylus tip on the device Z' axis; and $z_t''$=the length from the center of the pivot to the stylus tip. If γ and β can be found, then the coordinates of the stylus tip in the device coordinate system can be found from Equation 2.

To find the angles γ and β, an exemplary embodiment of the present invention uses two LVDTs operably engaging a flat plate. As the stylus is pivoted, so is the flat plate, resulting in a displacement of the effectors of the LVDTs. As shown in FIGS. 3 and 4, effector 66 is in contact with point P when distal tip 54 is in the neutral position A. With deflection of distal tip 54 to point B, effector 66 is moved, with sliding, from contact at point P to contact at point P" and displaced in the Z' axis a distance equal to Δz. In addition, because stylus 16 pivots, distal tip 54 moves in an arc which should "lift" distal tip 54 from the surface of the work piece a distance proportional to the displacement of the tip from point A to point B as a function of the radius of the arc. Distal tip 54 does not actually "lift" from the work surface and this error is noted as $\Delta z^x$ in the Figure and is corrected for.

The x, y, and z coordinates of point P are known in the device coordinate system and are easily defined, even after pivoting from point P to point P". The equation for finding the x, y, and z coordinates of point P" after a rotation is given by:

$$\begin{Bmatrix} x_{P''} \\ y_{P''} \\ z_{P''} \end{Bmatrix} = \begin{Bmatrix} x_P \\ y_P \\ z_P \end{Bmatrix} + \Delta Z_P \begin{Bmatrix} \sin\theta \\ 0 \\ -\cos\theta \end{Bmatrix} \quad \text{Eq. 3}$$

Where:
$x_{P''}$=the x coordinate of where the effector touches the plate after deflection;
$y_{P''}$=the y coordinate of where the effector touches the plate after deflection;
$z_{P''}$=the z coordinate of where the effector touches the plate after deflection;
$x_P$=the x coordinate of where the effector touches the plate before deflection;
$x_P$=the y coordinate of where the effector touches the plate before deflection;
$x_P$=the z coordinate of where the effector touches the plate before deflection; and
θ=the angle of the slant of the LVDT to the device Z axis.

Since there are two LVDTs, the x, y, and z coordinates for the other effector, touching the plate at points Q to Q" (not shown in the Figures) are:

$$\begin{Bmatrix} x_{Q''} \\ y_{Q''} \\ z_{Q''} \end{Bmatrix} = \begin{Bmatrix} x_Q \\ y_Q \\ z_Q \end{Bmatrix} + \Delta Z_Q \begin{Bmatrix} 0 \\ -\sin\theta \\ -\cos\theta \end{Bmatrix} \quad \text{Eq. 4}$$

Where:
$x_{Q''}$=the x coordinate of where the effector touches the plate after deflection;
$y_{Q''}$=the y coordinate of where the effector touches the plate after deflection;
$z_{Q''}$=the z coordinate of where the effector touches the plate after deflection;
$x_Q$=the x coordinate of where the effector touches the plate before deflection;
$x_Q$=the y coordinate of where the effector touches the plate before deflection;

$x_Q$=the z coordinate of where the effector touches the plate before deflection; and θ=the angle of the slant of the LVDT to the device Z axis.

Solving equation 1 for x", y", and z" for two LVDTs at points P to P" and Q to Q" yields:

$$\begin{Bmatrix} x_{P''} \\ y_{P''} \\ z_{P''} \end{Bmatrix} = \begin{bmatrix} \cos\gamma & 0 & -\sin\gamma \\ \sin\gamma\sin\beta & \cos\beta & \cos\gamma\sin\beta \\ -\sin\gamma\cos\beta & -\sin\beta & \cos\gamma\cos\beta \end{bmatrix} \left\{ \begin{bmatrix} x_P \\ y_P \\ z_P \end{bmatrix} + \Delta Z_P \begin{bmatrix} -\sin\theta \\ -\cos\theta \\ 0 \end{bmatrix} \right\}; \quad \text{Eq. 5}$$

and $$\begin{Bmatrix} x_{Q''} \\ y_{Q''} \\ z_{Q''} \end{Bmatrix} = \begin{bmatrix} \cos\gamma & 0 & -\sin\gamma \\ \sin\gamma\sin\beta & \cos\beta & \cos\gamma\sin\beta \\ -\sin\gamma\cos\beta & -\sin\beta & \cos\gamma\cos\beta \end{bmatrix} \left\{ \begin{bmatrix} x_P \\ y_P \\ z_P \end{bmatrix} + \Delta Z_Q \begin{bmatrix} 0 \\ -\cos\theta \\ -\sin\theta \end{bmatrix} \right\}. \quad \text{Eq. 6}$$

From Equations 3 and 5 comes:

$$z_{P''}=-x_{P''}\sin\gamma\cos\beta - y_{P''}\sin\beta + z_{P''}\cos\gamma\cos\beta \qquad \text{Eq.7}$$

and from Equations 4 and 6 comes:

$$z_{Q''}=-x_{Q''}\sin\gamma\cos\beta - y_{Q''}\sin\beta + z_{Q''}\cos\gamma\cos\beta \qquad \text{Eq.8}$$

For each effector in relation to the stylus geometry, the distance $z_{P''}$ and $z_{Q''}$ is the length from the center pivot point to the center of the top of the plate. For this reason, $z_{P''}$ and $z_{Q''}$ are equal and will be called $z_{PQ}''$ from now on. In Equations 7 and 8, the only two unknowns are γ and β with $x_{P''}$, $y_{P''}$, and $z_{P''}$ coming from Equation 3, and $x_{Q''}$, $y_{Q''}$, and $z_{Q''}$, coming from Equation 4.

Rearranging and applying Cramer's rule yields:

$$\delta\sin\beta = z_{PQ}''((z_{Q''}-z_{P''})\cos\gamma + (x_{P''}-x_{Q''})\sin\gamma); \qquad \text{Eq.9}$$

and $$\delta\cos\beta = z_{PQ}''(y_{Q''}-y_{P''}); \qquad \text{Eq. 10}$$

where:
where:

$a=(y_{Q''}z_{P''}-y_{P''}z_{Q''})^2 - z_{PQ}''^2(z_{Q''}-z_{P''})^2;$
$b=(y_{P''}x_{Q''}-y_{Q''}x_{P''})^2 - z_{PQ}''^2(x_{P''}-x_{Q''})^2;$
$c=2[(y_{Q''}z_{P''}-y_{P''}z_{Q''})(y_{P''}x_{Q''}-y_{Q''}x_{P''})-z_{PQ}''^2(z_{Q''}-z_{P''})(x_{P''}-x_{Q''})];$ and
$d=z_{PQ}''^2(y_{Q''}-y_{P''})^2.$ Solving Equation 11 for γ yields four solutions and the angle that is closest to zero is the correct angle. Using the chosen γ, β is found from Equation 9. Lastly, the values for γ and β are used in Equation 2 to determine the coordinates for the stylus tip, which are then used to determine the tilt vector direction.

FIG. 5 depicts the response of the device of the present invention to a rotational change in the path, or seam, being followed on the workpiece. Rotational change of this type is a change in the direction of the tangential vector of the direction of travel over a curve, i.e., pitching of the instantaneous Y axis in the Z axis direction corresponding to the local coordinate system of the contact point of distal tip 54 with the surface of the workpiece. In FIG. 5, the change in distance along the Z axis, given as ΔZ in the Figure, is computed as a change in pitch of the path, or seam, occurring over the distance ΔY. Probe device 10 is rotated an amount equal to the angle λ which is geometrically proportional to ΔZ and ΔY, the distance traveled along the Y axis.

The foregoing description is considered as illustrative only of the principles of the invention, and since numerous modifications and changes will readily occur to those skilled in the art, it is not a desire to limit the invention to the exact construction and operation shown and described. Accordingly, all suitable modifications and equivalents may be resorted to, falling within the scope of the present invention.

We claim:

1. A device, mountable on a working end of a fully automated and articulated robotic arm movable in six dimensions in a global dimensional reference, for three dimensional tactile tracing of a surface of a workpiece in an orthogonal coordinate system using a device local dimensional reference of an X axis, a Y axis and a Z axis, as the device is moved by the robotic arm and operably engages the workpiece, the device comprising:

a base having a proximal end and a distal end oriented along the Z axis, attachable proximally to the working end of the robotic arm and having a first surface oriented parallel to the Z axis, proximal to distal;

a carriage rollably mounted to the first surface having a reversible operable motion confined to the Z axis, the carriage including a proximal arm aligned generally orthogonal to the Z axis and having a proximal surface and a distal surface, and a distal arm with a ball socket;

means, operably connected between the base and the proximal surface, for biasing the carriage motion in the distal direction;

a probe having a proximal portion, a mid portion, and a distal portion aligned along a longitudinal axis for engaging the workpiece, the proximal portion including a plate with a flat surface orthogonal to the longitudinal axis, the longitudinal axis defining a center point on the flat surface, the mid portion including a ball operably pivotally engaging the ball socket and defining a center pivot point on the longitudinal axis, the center point of the plate fixed a first distance proximal to the center pivot point, and the distal portion includes a distal tip for operably engaging the surface of the workpiece and is fixed a second distance distal to the center pivot point along the longitudinal axis, and when the ball operably engages the socket, the flat surface faces generally proximally toward the distal surface of the proximal arm;

Z axis measuring means, operably positionable between the base and the proximal surface of the proximal arm, for measuring distance of movement of the carriage parallel to the Z-axis and generating a measurement data stream; and plate tilt measuring means, operably positionable between the flat surface of the plate and the distal surface of the proximal arm, for measuring the tilting of the flat surface of the plate in relation to the Z axis as a result of pivoting the ball in the ball socket and generating a measurement data stream.

2. The device of claim 1 in which the Z axis measuring means includes a first linear position transducer and the plate tilt measuring means includes second and third linear position transducers, the second linear transducer operably positionable between the proximal arm and the flat surface, operably engaging the flat surface at a point a third distance from the center point in the X axis, and the third linear position transducer operably positionable between the proximal arm and the flat surface, operably engaging the flat surface at a point a fourth distance from the center point in the Y axis.

3. The device of claim 2 in which the first linear position transducer is fixedly engaging the base and is aligned parallel to the Z axis, and the second and third linear transducers are fixedly engaging the proximal arm and each are aligned at an angle to the Z axis.

4. The device of claim 2 in which the first linear position transducer is fixedly engaging the base and is aligned parallel to the Z axis, and the second and third linear transducers are fixedly engaging the proximal arm and each are aligned parallel to the Z axis.

5. The device of claim 1 further comprising means, operably connected to the first and second measuring means, for receiving measurement data streams from the first and second measuring means.

6. The device of claim 5 further comprising control means, operably connected between the receiving means and the robotic arm, for controlling the movements of the robotic arm according to the measurement data from the receiving means.

7. The device of claim 6 in which the control means includes program means for processing measuring data into robotic arm movement commands so that when the device is positioned with the distal tip in contact with a point, at a start position, on a surface of the workpiece and in an optimal orientation, in the X, Y, and Z axes, in relation to the surface point of the workpiece, then any measured deviation of the distal tip, in the X, Y, and Z axes, from the optimal orientation caused by movement of the device by the robotic arm across the workpiece surface results in commands from the program means to the robotic arm to change articulations of the robotic arm and counter the deviations of the distal tip thus maintaining the optimal orientation, in the X, Y, and Z axes, of the device over that point of the surface of the workpiece in contact with the distal tip during movement of the device.

8. The device of claim 7 further comprising memory means, operably connected to the program means, for storing in memory at least the start position, the optimal orientation, the deviations, if any, of the distal tip as the device is moved by the robotic arm, and the commands to the robotic arm, in relation to the global reference system, to change articulations of the robotic arm so as to maintain the optimal orientation of the device over the point of the surface of the workpiece in contact with the distal tip during movement of the device.

9. The device of claim 1 further comprising means, operably engaging the ball and socket, for urgingly biasing the probe toward centering the longitudinal axis of the probe parallel to the Z axis.

10. The device of claim 1 further comprising means, operably engaging the distal tip, for reducing friction from the distal tip engaging the surface of the workpiece.

11. The device of claim 10 in which the means for reducing friction includes a rolling ball in a socket.

12. The device of claim 10 in which the means for reducing friction includes a material having a low coefficient of friction.

13. The device of claim 1 in which the means for biasing the carriage motion includes a spring in compression.

14. The device of claim 1 further comprising means for biasing the probe longitudinal axis toward alignment with the device Z axis.

15. The device of claim 14 in which the biasing means includes a spring biasing.

16. The device of claim 14 in which the biasing means includes an electromagnetic mechanism.

17. The device of claim 14 in which the biasing means includes a housing carried by the carriage for housing the proximal arm, ball socket and the probe proximal and mid portions with the probe distal portion extending through an opening in the housing, and having at least one spring biased between the housing and the probe.

* * * * *

UNITED STATES PATENT AND TRADEMARK OFFICE
CERTIFICATE OF CORRECTION

PATENT NO. : 6,013,997
DATED : January 11, 2000
INVENTOR(S) : Robert James Heideman, Elmer Gerald Blachowiak, Christopher Brian Smith, Stephen L. Carian, Brandon Stuart Tarr, Neil Arthur Duffie, Michael Harry Predith It is certified that error appears in the above-identified patent and that said Letters Patent is hereby corrected as shown below:

Column 2, line 26, delete the word "special" and insert -- spacial --

Signed and Sealed this

Twenty-first Day of November, 2000

*Attest:*

Q. TODD DICKINSON

*Attesting Officer*  *Director of Patents and Trademarks*

UNITED STATES PATENT AND TRADEMARK OFFICE
CERTIFICATE OF CORRECTION

PATENT NO : 6,013,997

DATED : January 11, 2000

INVENTOR(S) : Robert James Heideman, Elmer Gerald Blachowiak, Christopher Brian Smith, Stephen Lee Carian, Brandon Stuart Tarr, Neil Arthur Duffie, Michael Harry Predith It is certified that error appears in the above-identified patent and that said Letters Patent is hereby corrected as shown below:

Column 11, line 48, after the word "where:" insert --

$\delta = (y_{Q''}z_{P''} - y_{P''}z_{Q''})\cos\gamma + (y_{P''}x_{Q''} - y_{Q''}x_{P''})\sin\gamma$.

Equations 9 and 10 are then squared, added together, and the trigonometric identities are used for substitution to yield:

$(a-d)\tan^4(\gamma/4) - 2c\tan^3(\gamma/4) + (-2a + 4b - 2d)\tan^2(\gamma/2) + 2c\tan(\gamma/2) + (a-d) = 0$;   Eq. 11 --

Signed and Sealed this

Thirteenth Day of March, 2001

*Attest:*

NICHOLAS P. GODICI

*Attesting Officer*   *Acting Director of the United States Patent and Trademark Office*